April 29, 1958 W. A. KNOLL ET AL 2,832,618
TRANSPIRATION COOLED SEAL
Filed Jan. 3, 1956

INVENTOR.
WILLIAM A. KNOLL
CORNELIUS E. VANDENBERG
BY
William R. Lane
ATTORNEY

United States Patent Office 2,832,618
Patented Apr. 29, 1958

2,832,618

TRANSPIRATION COOLED SEAL

William A. Knoll, Los Angeles, and Cornelius E. Vandenberg, Fullerton, Calif., assignors to North American Aviation, Inc.

Application January 3, 1956, Serial No. 557,165

14 Claims. (Cl. 288—6)

This invention relates to transpiration cooled seals for applications having high ambient temperatures.

Two types of seals have been proposed for applications where the temperatures are 500° F. and higher. The first type consists of inflatable thin-walled metal tubes, and the second type consists of internally cooled inflatable synthetic tubes made of silicone rubber and similar materials. The first type of seal has not been satisfactory where the surfaces are relatively wavy, have locally rough faces, have variable aperture dimensions, or have three dimensional curved planes. The difficulties encountered with this type of seal are due to the inability of the metal to conform to the shape of the mating surfaces without exceeding its elastic limit.

To overcome the latter difficulties encountered with leak proof metal tubes, experimentation has been made with seals of the more elastic materials, such as silicone rubber and similar other synthetic materials. These have failed at high temperatures because the heat transfer coefficients of the available materials have been too low to permit cooling of the outer surface of the seal which is in contact with the hot surfaces. It was found that the exterior surfaces of the seals burned.

In this invention the desirable features of the above two types of seals are combined with transpiration cooling. In one embodiment, a flexible porous tube is used, and the walls of the tube are such that it is permeable to and saturable by the coolant fluid which is contained therein under pressure. Under operating conditions, the pressure in the tube is sufficient to seal against a given pressure. The liquid contained in the tube saturates the wall and seeps through, and as the coolant reaches the heated surfaces it boils off.

Another embodiment of this invention employs a central leak proof tube which is under fluid pressure within. Immediately surrounding the leak proof tube is a metal tube. This can be made of tightly woven fine wire or of a thin, flexible metal tube having interspersed holes for coolant leakage. External of the metal tube is a porous cloth, such as canvas, or a fiber glass hose. A coolant fluid is supplied under pressure between the leak proof tube and the metal tube by a connection into the metal tube or into the outer tube. The coolant in this embodiment functions in the same way as in the first embodiment and the metal hose is added to provide better heat transfer. A third type of configuration provided in this invention has a metal layer woven into a cloth or fiber glass hose. The metal layer can also consist of a thin, hollow tube between two layers of cloth or fiber glass.

Therefore, an object of this invention is to provide an improved tube seal for high temperature applications.

A principal object of this invention is to provide a transpiration cooled seal.

A further object of this invention is to provide a transpiration cooled seal which has a coolant supply within the sealing hose, said coolant seeping through the hose to keep its surfaces cool with respect to the sealed surfaces.

It is a still further object of this invention to provide a transpiration cooled seal in which three substantially concentric tubes are employed, the innermost tube being sealed and under pressure to expand to the outer tubes which are porous to a coolant supplied to them.

An object of this invention is to provide a transpiration cooled seal which seals a rotating shaft in a frame and provides lubrication between said seal and shaft.

Another object of this invention is to provide a transpiration cooled seal in which a woven porous tube, through which a pressurized coolant passes, has a metal layer between its surfaces.

Other objects of invention will become apparent from the following description taken in connection with the accompanying drawings in which Fig. 1 is a cross sectional view of two mating surfaces having a transpiration cooled sealing tube therebetween;

Figure 1:
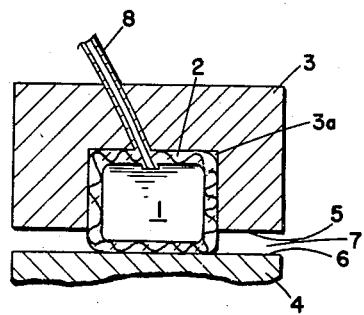

Referring to Fig. 1, the mating surfaces 5 and 6 of plates 3 and 4, respectively, are in juxtaposition. Transpiration cooled seal 2 is secured in groove 3a of plate 3 and it forms the seal between surfaces 5 and 6 and gap 7 between them. Coolant fluid 1 is supplied under pressure from a remote source to the interior of tube 2 via tube 8. Tube 2 can be cloth, such as an unlined canvas fire hose, or can be a porous, woven fiber glass hose. The coolant pressure must be sufficient to seal against any given pressure on the high pressure side of gap 7. The cooling fluid saturates the wall of tube 2 and then seeps through to relatively hot plates 3 and 4 where it is caused to boil away. The continual supply of the coolant under pressure maintains the exterior wall temperatures of tube 2 below its charring temperature, and permits the maintenance of an effective seal between surfaces 5 and 6. Generally, the coolant fluid selected should have a boiling point less than the heat source temperature at the ambient pressure adjacent to the heat source.

Figure 2:
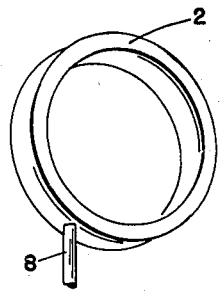
Fig. 2 is a perspective view of the exterior of a transpiration cooled seal.

In Fig. 2 is shown a perspective view of a transpiration cooled seal 2 having a supply tube 8. The particular configuration of circular tube 2 could be used either between two cylindrical surfaces, or between two flat surfaces where one covers a circular opening in the other, as shown in Fig. 3.

Figure 3:
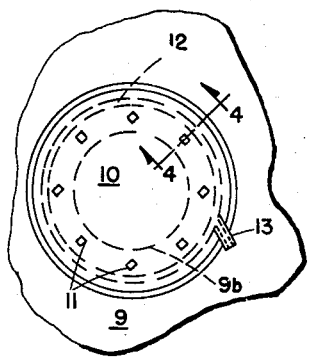
Fig. 3 is a plan view of a manhole or handhole cover on a body plate with a transpiration cooled tube as a seal between the two.
Figures 4, 5:
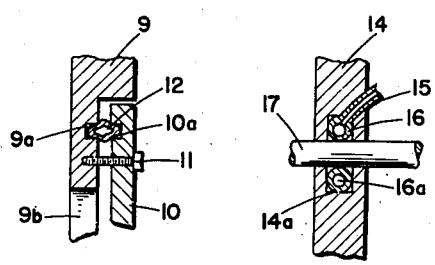
Fig. 4 is a cross sectional view taken along the lines 4—4 of Fig. 3.
Fig. 5 illustrates the use of a transpiration cooled seal on a turning shaft.

In Fig. 3 is shown handhole or manhole cover 10 which closes opening 9b in plating 9, which, for example, could be the surface of a high speed aircraft or guided missile. Transpiration cooled seal 12 is shown between cover 10 and plate 9 which are held tightly together by bolts 11. Tube 13 provides the coolant supply to tube 12. In Fig. 4, which is a view taken along the lines 4—4 of Fig. 3, plating 9, cover 10, seal 12, and bolt 11 are shown in cross section. Transpiration cooled seal 12 is shown fitted into groove 9a of plating 9 and groove 10a of cover 10.

Referring to Fig. 5, an example of the present invention as a seal around a rotating shaft is shown. Porous tube 16 is fitted in groove 14a of frame or body 14. Tube 16 surrounds and is in contact with the cylindrical surface of turning shaft 17. Tube 16 is supplied with a coolant 16a under pressure through line 15 which extends through frame 14 from a remote source. The seeping fluid, in addition to cooling, acts as a lubricant between the seal and the shaft.

Figure 6:
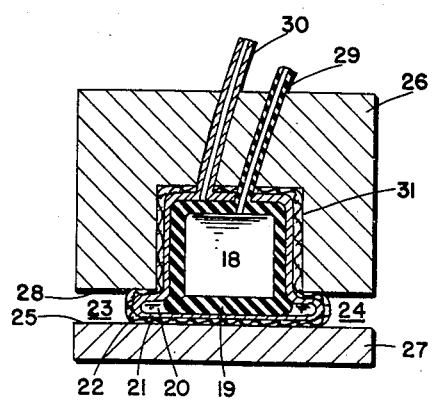
Fig. 6 shows a cross sectional view of a transpiration cooled seal having a sealed and pressure expanded central tube.

In Fig. 6, another embodiment of the invention is shown. Three tubes of different materials are arranged substantially concentrically, one within the other. Innermost tube 19 is sealed and made of a material such as a synthetic silicone rubber. Tube 19 is pressurized through supply line 29, either with a liquid or with a gas 18. Fluid 18 can be a coolant if it is desirable. Immediately external to tube 19 is metal tube 21 which is flexible and loosely fitted on tube 19. Tube 21 is fitted so that when tube 19 is under considerable pressure, tube 21 will then be relatively snug around tube 19. Tube 21 can be constructed of woven fine wire or can be made of a thin piece of metal with small openings in its wall so that it will be porous to fluid under pressure therein. Cooling fluid 20 is supplied into the space between tube 21 and tube 19 through tube 30 which extends through tube 21 into the last mentioned space. Tube 21, being porous, allows fluid 20 to seep into finely woven cloth hose or fiber glass hose 22 which is immediately external of tube 21. Hose 22, like tube 2, permits seepage of the coolant into gaps 23 and 24 between the surfaces 28 and 25, which are to be sealed. As the coolant passes through hose 22, it will boil off because of the high temperature of surfaces 25 and/or 28 of plates 27 and 26, respectively.

Figure 7:
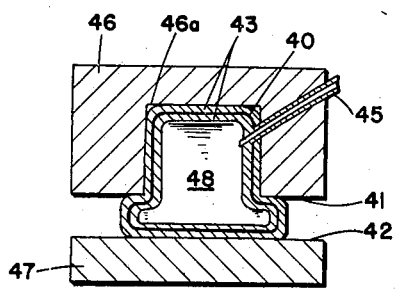
Fig. 7 is a cross sectional view of porous tube having a metal layer between the inner and outer surfaces.

In Fig. 7, another embodiment of the invention is shown. Tube 43 in groove 46a is made of closely woven cloth, such as canvas, or of fiber glass and has a thin layer of metal 40 between its inner and outer surfaces. This metal can be woven into the cloth or fiber glass directly in the form of thin wire or can be a thin tube having holes to permit passage of fluid. If metal 40 is a tube, then tube 43 will consist of two tubes, one fitted tightly on each side of the metal. This embodiment seals in the same manner as that shown in Fig. 6. Coolant 48 is supplied under pressure through tube 45 into tube 43 and it passes through metal layer 40 and the walls of tube 43. Plates 46 and 47 have their mating surfaces 41 and 42, respectively, held tightly in juxtaposition. As the coolant seeps through the exterior of tube 43, it boils away and prevents charring or burning of the cloth or fiber glass tube.

The transpiration cooled seals provided in this invention have been found to be very effective in sealing high temperature metal plates, as found in guided missile applications. The trouble encountered in the known seals has been that they charred or burned, and thereby failed to seal. This failure has been eliminated by transpiration cooling along the exterior of the seal. The addition of the separate metal tube between the inner hose and the outer hose, or the addition of the metal layer in a single hose, as in Fig. 7, has been made where it is desirable to have a good conductor in the seal for the purpose of transferring heat. The heat is conducted, for example, from the missile metal surfaces to the metal hose or metal layer, from which it passes in two directions, one being along the metal hose circumferentially and to the cooler areas of the metal in the tube. These cooler areas would be in the gaps, such as 23 and 24 in Fig. 6, and along any portion of the tube, such as the corners of holding grooves 31 and 46a, where the hose would not be in necessarily tight contact with the heated metal surface. The other direction in which the heat passes is through the metal into the flexible glass or cloth hose immediately inside the metal surface of the tube. The metal hose or metal layer in the hose provides another surface for the absorption of heat from which it can be removed by the coolant. The coolant thereby acts to keep the temperature of the cloth, in contact with the missile surfaces, below its charring temperature. In the embodiment shown in Fig. 6, having an inner sealed tube 19, coolant 20 acts to keep the temperature of tube 19 below its melting temperature. The used coolant, as it boils away, is dissipated into the ambient atmosphere.

Thus, it can be seen the present invention provides an excellent seal in high temperature installations. Heretofore, it was not possible to seal between two variable surfaces because the seals that could make good sealing contact over any surface would char or melt, and the seals that would not burn, as metal, would not conform to the mating surfaces without exceeding their elastic limits. When metal is used as part of the present invention, exceeding its elastic limit is not a problem because of the flexible cloth or fiber glass surface covering the exterior of the metal.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A high temperature sealing device comprising a hollow tube having a wall permeable to fluid under pressure from within said tube through the wall thereof to the exterior surface of said tube, means maintaining fluid under pressure in said tube, and at least two mating surfaces to be sealed, said tube being between and in contact with each of said surfaces.

2. A high temperature sealing device comprising a hollow tube, said tube being permeable to fluid under pressure from within said tube through the wall thereof to the exterior surface of said tube, means maintaining fluid under pressure in said tube, at least two mating surfaces to be sealed and means to hold said tube between said surfaces, said tube being held in contact with each of said surfaces.

3. In combination, at least two adjacent bodies to be sealed, a hollow tube fitted between said bodies and adapted to carry a fluid under pressure, the wall of said tube being permeable to said fluid under pressure so that the fluid will flow through the wall of said tube so as to contact said bodies.

4. In combination, two adjacent bodies to be sealed, said bodies having plane surfaces, a hollow gasket fitted between said plane surfaces, and means maintaining fluid under pressure in said gasket, the wall of said gasket being permeable to said fluid under pressure so that said fluid will flow from within said gasket through said wall to the exterior surface thereof.

5. In combination, two adjacent bodies to be sealed, a hollow tube fitted between said bodies, means maintaining fluid under pressure in said tube, and means maintaining said fluid so as to be cooler than at least one of said bodies, the wall of said tube being permeable to said fluid under pressure so that said fluid will flow through said wall to contact said bodies.

6. A high temperature sealing device comprising a hollow tube, said tube being permeable to fluid under pressure from within said tube through the wall thereof to the exterior surface of said tube, means maintaining fluid under pressure in said tube, at least two mating surfaces to be sealed, means to hold said tube between said surfaces, said tube being held in contact with each of said surfaces, and means maintaining said fluid at a temperature lower than at least one of said surfaces.

7. In combination, two adjacent bodies to be sealed, a hollow tube fitted between said bodies, means maintaining fluid under pressure in said tube, and means maintaining said fluid at a temperature lower than at least one of said bodies, said tube being permeable to said fluid under pressure from within said tube through the wall thereof to the exterior surface of said tube, the temperature of at least one of said bodies being at least as high as the boiling point of said fluid when it has permeated said tube.

8. A high temperature sealing device comprising a plurality of substantially concentric tubes, means maintaining pressure in the innermost tube of said concentric tubes, the external tube of said concentric tubes being porous, means to maintain fluid pressure between said external tube and said innermost tube.

9. A high temperature sealing device comprising a hollow sealed tube under pressure, means maintaining pressure in said sealed tube, a first porous tube surrounding said sealed tube, a second porous tube surrounding said first porous tube, means maintaining fluid under pressure between said sealed tube and said porous tubes, at least two mating surfaces to be sealed, and means to hold said tubes between surfaces.

10. In combination, at least two adjacent bodies to be sealed, a hollow sealed tube under pressure, means maintaining pressure in said sealed tube, a first porous tube surrounding said sealed tube, a second porous tube surrounding said first porous tube, means maintaining fluid under pressure between said sealed tube and said porous tubes, at least two mating surfaces to be sealed, means to hold said tubes between said surfaces, and means maintaining said fluid at a lower temperature than at least one of said surfaces.

11. The combination according to claim 10 in which said first porous tube is made of woven fine wire.

12. In combination, at least two adjacent bodies to be sealed, a hollow sealed tube under pressure, means maintaining pressure in said sealed tube, a porous tube surrounding said sealed tube, said porous tube having a thin layer of metal between its inner and outer surfaces, means maintaining fluid under pressure between said sealed tube and said porous tube, said metal layer being permeable to said fluid, means maintaining said fluid at a lower temperature than at least one of said surfaces, and means to hold said tubes between said surfaces.

13. In combination, at least two adjacent bodies to be sealed, a hollow tube fitted between said bodies, said tube having a thin layer of metal between its inner and outer surfaces, means maintaining fluid under pressure in said tube, and means maintaining said fluid at a temperature lower than at least one of said bodies, said tube being permeable to said fluid under pressure.

14. In combination, a rotating shaft in a frame, a groove in said frame, said groove surrounding said shaft, a hollow tube fitted in said groove, said tube being in continuous contact with said shaft, a fluid under pressure in said tube, means to maintain said fluid under pressure in said tube, said tube being permeable to said fluid, and means maintaining said fluid in said tube at a lower temperature than said shaft where said shaft contacts said tube whereby said fluid in permeating said tube cools the exterior of said tube and lubricates said shaft at its contact with said tube.

References Cited in the file of this patent

UNITED STATES PATENTS

| | | |
|---|---|---|
| 1,873,267 | Bigelow et al. | Aug. 23, 1932 |
| 2,606,046 | Bonner et al. | Aug. 5, 1952 |